United States Patent
Zhang et al.

(10) Patent No.: US 9,003,029 B2
(45) Date of Patent: Apr. 7, 2015

(54) METHOD, APPARATUS AND SYSTEM FOR JOINT OPTIMIZATION

(71) Applicant: Huawei Technologies Co., Ltd., Shenzhen, Guangdong (CN)

(72) Inventors: Hongbo Zhang, Shenzhen (CN); Guangyu Shi, Santa Clara, CA (US); Liufei Wen, Shenzhen (CN); Xiangyang Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 13/721,530

(22) Filed: Dec. 20, 2012

(65) Prior Publication Data

US 2013/0117443 A1 May 9, 2013

Related U.S. Application Data

(63) Continuation of application No. PCT/CN2011/075388, filed on Jun. 7, 2011.

(30) Foreign Application Priority Data

Oct. 30, 2010 (CN) .......................... 2010 1 0525399

(51) Int. Cl.
*H04L 12/26* (2006.01)
*H04L 12/24* (2006.01)
(Continued)

(52) U.S. Cl.
CPC ........ *H04L 43/0876* (2013.01); *H04L 41/0896* (2013.01); *H04L 41/12* (2013.01); *H04L 45/00* (2013.01); *H04L 67/327* (2013.01)

(58) Field of Classification Search
CPC ............ H04L 61/1511; H04L 67/1002; H04L 67/1008; H04L 67/101; H04L 67/1021; H04L 67/1012; H04L 67/1023; H04L 67/1091; H04L 45/50; H04L 45/64; H04L 65/80; H04L 45/302; H04L 41/0896

USPC ........ 709/224, 223, 201, 202, 217–220, 238, 709/239, 242, 243
See application file for complete search history.

(56) References Cited

U.S. PATENT DOCUMENTS

2003/0048750 A1* 3/2003 Kobayashi ..................... 370/229
2003/0058797 A1* 3/2003 Izmailov et al. ............... 370/238
(Continued)

FOREIGN PATENT DOCUMENTS

| CN | 1688133 A | 10/2005 |
|---|---|---|
| CN | 101541025 A | 9/2009 |

(Continued)

OTHER PUBLICATIONS

Wenjie Jiang et al., "Cooperative Content Distribution and Traffic Engineering in an ISP Network," Jun. 15-19, 2009, ACM SIGMETRICS '09 Proceedings of the eleventh international joint conference on Measurement and modeling of computer systems, pp. 239-250, dl.acm.org/citation.cfm?id=1555377.*

(Continued)

*Primary Examiner* — Ruolei Zong
(74) *Attorney, Agent, or Firm* — Slater & Matsil, L.L.P.

(57) ABSTRACT

Embodiments of the present invention disclose a method, an apparatus and a system for joint optimization. The method for joint optimization includes: decomposing the joint optimization of an entire network into the joint optimization performed in each sub-network, regarding a bandwidth requirement for a server off the sub-network as a bandwidth requirement for a virtual server on a port, iteratively performing the joint optimization in each sub-network, and applying results of the joint optimization in the network. In the embodiments of the present invention, the bandwidth requirement for the server off the sub-network is regarded as the bandwidth requirement for the virtual server on the port, the joint optimization is iteratively performed in each sub-network, and the results of the joint optimization are applied in the network, so that the joint optimization of the entire network is performed in parallel.

14 Claims, 6 Drawing Sheets

(51) Int. Cl.
*H04L 12/701* (2013.01)
*H04L 29/08* (2006.01)

(56) References Cited

U.S. PATENT DOCUMENTS

2004/0174884 A1* 9/2004 Wright .................... 370/395.41
2005/0232254 A1 10/2005 Korner
2011/0296053 A1* 12/2011 Medved et al. ............... 709/241

FOREIGN PATENT DOCUMENTS

| CN | 101707788 A | 5/2010 |
| CN | 101753450 A | 6/2010 |
| RU | 2310994 C2 | 11/2007 |

OTHER PUBLICATIONS

1st office action issued in corresponding Chinese patent application 201010525399.7, dated Dec. 26, 2012, and English translation thereof, total 9 pages.

Russian Notice of Allowance received in Application No. 2012137874108 mailed Feb. 20, 2014, 11 pages.

Alimi, R. et al., "P4P: Provider Portal for P2P Applications draft-p4p-framework-00.K" Network Working Group, Nov. 17, 2008, 28 pages.

DiPalantino, D. et al., "Traffic Engineering vs. Content Distribution A Game Theoretic Perspective," IEEE INFOCOM, Conference Apr. 19-25, 2009, 9 pages.

Extended European Search Report received in Application No. 11783095.0-2416 mailed Oct. 25, 2012, 11 pages.

International Search Report received in Application No. PCT/CN2011/075388, mailed Sep. 15, 2011, 3 pages.

Jiang, W. et al., "Cooperative Content Distribution and Traffic Engineering in an ISP Network," Princeton University, SIG Metrics/Performance '09, Seattle, WA, Jun. 15-19, 2009, 12 pages.

Lee, K. et al., "Distributed Routing Using Topology Database in Large Computer Networks," IEEE Conference Mar. 27-31, 1988, 10 pages.

Shrimali, G. et al., "Cooperative Interdomain Traffic Engineering Using Nash Bargaining and Decomposition," IEEE/ACM Transactions on Networking, vol. 18, No. 2, Apr. 2010, 12 pages.

Xia, P. et al., "Distributed Joint Optimization of Traffic Engineering and Server Selection," Hong Kong, IEEE 18th International Packet Video Workshop, Dec. 13-14, 2010, 8 pages.

Xie, H. et al., "P4P: Provider Portal for Applications," SIGCOMM'08, Seattle, Washington, Aug. 17-22, 2008, 12 pages.

Yang, Y. et al., "An Architecture of ALTO for P2P Applications draft-yang-alto-architecture-00.txt," ALTO Working Group, Mar. 4, 2009, 14 pages.

* cited by examiner

METHOD, APPARATUS AND SYSTEM FOR JOINT OPTIMIZATION

CROSS-REFERENCE TO RELATED APPLICATIONS

This application is a continuation of International Application No. PCT/CN2011/075388, filed on Jun. 7, 2011, which claims priority to Chinese Patent Application No. 201010525399.7, filed on Oct. 30, 2010, both of which are hereby incorporated by reference in their entireties.

FIELD OF THE INVENTION

The present invention relates to the field of communications technologies, and in particular, to a method, an apparatus and a system for joint optimization.

BACKGROUND OF THE INVENTION

The role of an ISP (Internet Service Provider, internet service provider) is mainly to provide internet access, and is required to solve the problem of traffic engineering (TE, Traffic Engineering), that is, to specify an optimal path for the traffic to minimize network congestion. The role of a CP (Content Provider, content provider) is to provide required content for a user, and is required to solve the problem of server selection (SS, Server Selection), that is, to specify an optimal server for a different user to minimize end-to-end delay. When the ISP and the CP accomplish the TE and the SS, respectively, it is not a global optimal state from the perspective of the entire network.

To obtain optimal performance of the entire network, currently people begin attempting joint optimization (Joint Optimization) of the TE and the SS, and use a Nash bargain solution (NBS, Nash Bargain Solution) and a convex optimization technique in a game theory to implement a cooperative game on the given TE and SS that are two optimization problems, so as to achieve global optimal balance.

A TE and SS joint optimization mathematical model established by using the NBS is a constrained convex optimization problem. In the prior art, a method for solving the joint optimization based on a centralized manner exists. It is assumed in the scheme that a certain computing device gathers entire network state information required for solving the optimization problem, adopts the centralized manner to obtain an optimal solution to a system, and applies the optimal solution in the network, to perform a route change policy and a new server selection policy. However, the scheme has bad extensibility. With the expansion of the network scale, time consumed for gathering information and computing increases rapidly. If the joint optimization is applied in a network of a larger scale, for example, an entire metropolitan area network or even a nation wide backbone network, real-time application of the existing method for joint optimization in the network is difficult to be guaranteed.

SUMMARY OF THE INVENTION

Embodiments of the present invention provide a method, an apparatus and a system for joint optimization, which effectively reduce the computation quantity and complexity of the joint optimization, and improve the performance and efficiency of an entire network.

A method for joint optimization includes:
obtaining link information, server and bandwidth information, and user requirement information of a sub-network, where the server and bandwidth information includes virtual server bandwidth of every external port of the sub-network, and the virtual server bandwidth is the bandwidth of a server off the sub-network, where the bandwidth of the server off the sub-network is required by the sub-network through the external port;

obtaining an optimal routing parameter and a server selection parameter of the sub-network according to the link information, the server and bandwidth information, and the user requirement information;

obtaining optimized ingress bandwidth of every external port of the sub-network according to the optimal routing parameter and the server selection parameter; and comparing the optimized ingress bandwidth and the virtual server bandwidth of every external port, and if the results of the comparison between the optimized ingress bandwidth and the virtual server bandwidth of all external ports are smaller than a set error value, applying the optimal routing parameter and the server selection parameter in the sub-network.

An embodiment of the present invention provides a computing apparatus for joint optimization, which includes:

a parameter gathering module, configured to obtain link information, server and bandwidth information, and user requirement information of a sub-network, where the server and bandwidth information includes virtual server bandwidth of every external port of the sub-network, and the virtual server bandwidth is the bandwidth of a server off the sub-network, where the bandwidth of the server off the sub-network is required by the sub-network through the external port;

a computing module, configured to obtain an optimal routing parameter and a server selection parameter of the sub-network according to the link information, the server and bandwidth information, and the user requirement information, and obtain optimized ingress bandwidth of every external port of the sub-network according to the optimal routing parameter and the server selection parameter; and an output module, configured to compare the optimized ingress bandwidth and the virtual server bandwidth of every external port, and if results of the comparison between the optimized ingress bandwidth and the virtual server bandwidth of all external ports are smaller than a set error value, apply the optimal routing parameter and the server selection parameter in the sub-network, and output the optimal routing parameter and the server selection parameter.

An embodiment of the present invention provides a communication network, which includes:

obtaining, by a system for joint optimization, link information, server and bandwidth information, and user requirement information of a sub-network, where the server and bandwidth information includes virtual server bandwidth of every external port of the sub-network;

computing an optimal routing parameter and a server selection parameter of the sub-network according to the link information, the server and bandwidth information, and the user requirement information, and obtaining optimized ingress bandwidth of every external port of the sub-network; and comparing the optimized ingress bandwidth of every external port and the virtual server bandwidth of the external port, and if a comparison result is smaller than a set error value, applying the optimal routing parameter and the server selection parameter in the network.

An embodiment of the present invention provides a system for joint optimization, which includes:

a computing apparatus for joint optimization, configured to gather link information, server and bandwidth information, and user requirement information, obtain a routing parameter and a server selection parameter, and obtain optimized ingress bandwidth and optimized egress bandwidth of every external port; and a content routing engine, configured to convert the routing parameter and the server selection parameter obtained by the computing apparatus for joint optimization into a routing parameter and a server selection parameter applied in a local network.

It can be seen from the technical solutions provided by the embodiments of the present invention that, in the embodiments of the present invention, the joint optimization computation is performed in parallel in each sub-network. The server off the sub-network is regarded as the virtual server on a device at the ingress of the sub-network, bandwidth of the virtual server is the smaller one of the value obtained by subtracting ingress background traffic from the optimized egress bandwidth computed in the joint optimization of a peer sub-network of this port and the value obtained by subtracting ingress background traffic from the ingress bandwidth of the port of the sub-network minus ingress background traffic, and through coupling between the virtual server bandwidth, that is, the bandwidth of the sub-network, the joint optimization computation is performed iteratively in each sub-network, so that a route selection policy and a server selection policy of the network are obtained, and application of the route selection policy and the server selection policy in the network optimizes the performance and utilization of the network.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions of the present invention will be clearly and completely described in the following with reference to the accompanying drawings in the embodiments of the present invention. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

An example is taken to illustrate a communication network applied in an embodiment of the present invention in the following.

Figure 1:
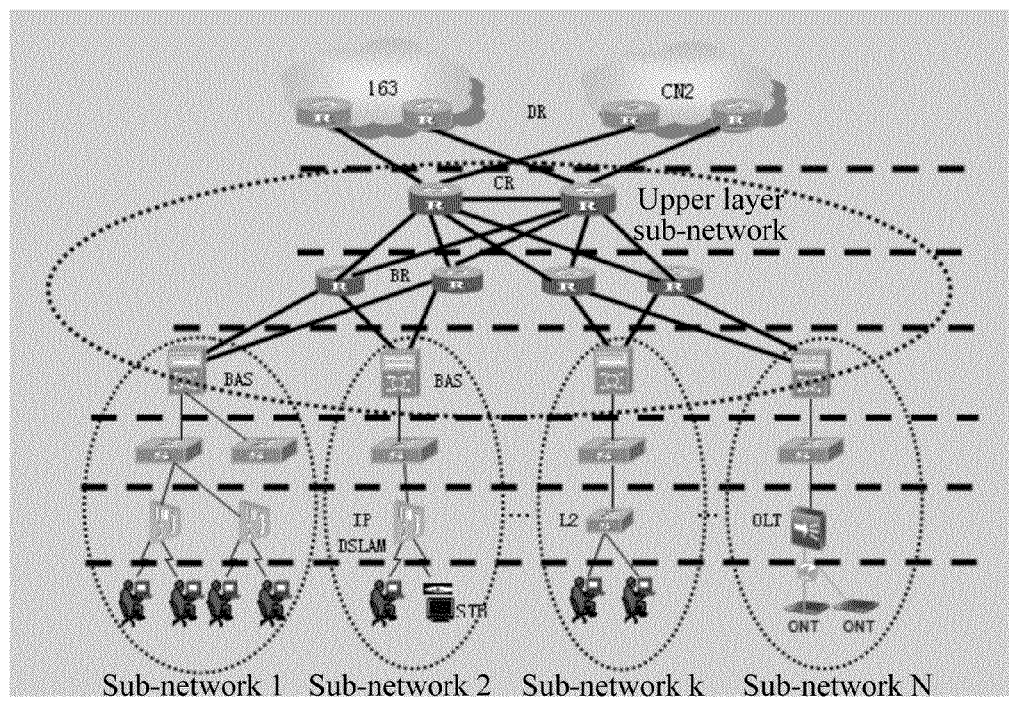
FIG. 1 shows an embodiment where a network for performing joint optimization is decomposed into two layers.

FIG. 1 shows that a network for performing joint optimization is decomposed into two layers, where a first layer is an access layer. A BAS (Broadband Access Server, broadband access server) is taken as a unit for sub-network division, that is, the BAS, and a switch and a DSLAM (Digital Subscriber Line Access Multiplexer, digital subscriber line access multiplexer) connected to the BAS compose a sub-network, and the BAS, and a border router (BR, Border Router) and a core router (CR, Core Router) connected above compose an upper layer sub-network. In the access layer, taking the BAS as a unit for sub-network division is a method for sub-network division, and the border router or another device may also be taken as a unit for sub-network division.

Figure 2:
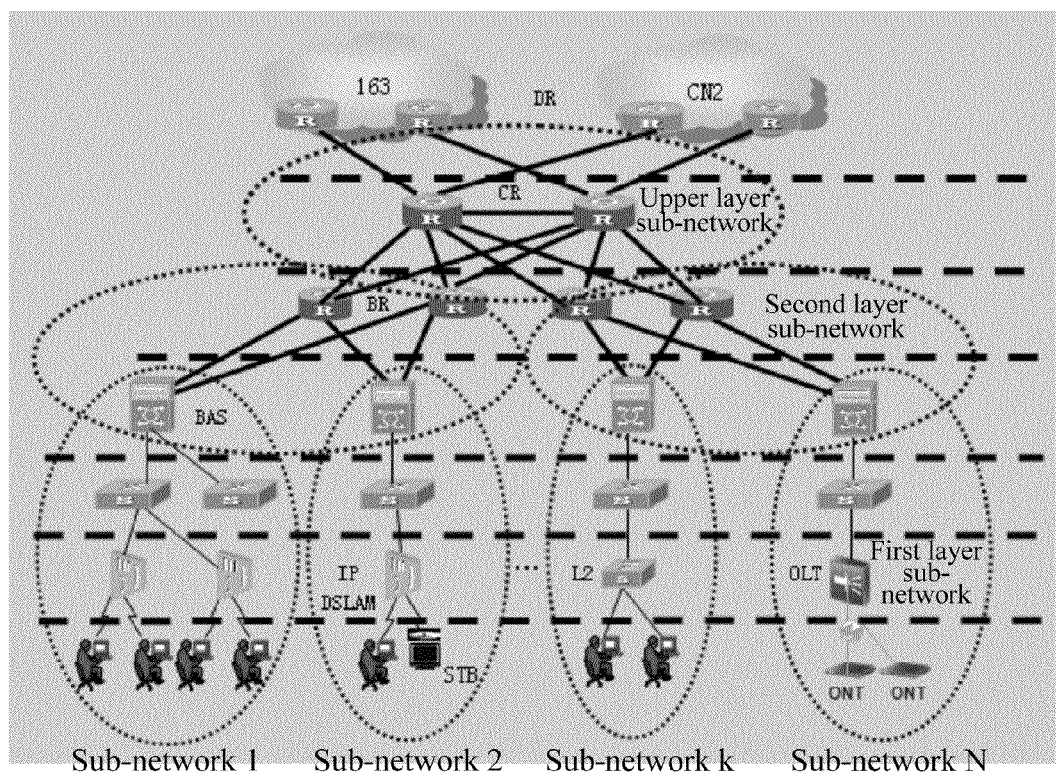
FIG. 2 shows an embodiment where a network for performing joint optimization is decomposed into three layers.

FIG. 2 shows an embodiment in which a network for performing joint optimization is divided into three layers. A first layer is an access layer, which is divided into a plurality of sub-networks with a BAS and a border router as units, a middle layer is divided into different sub-networks with the area as a unit, and a top layer is a sub-network including a network node, such as an egress router.

It should be noted that, the network is not limited to be decomposed into two or three layers, and may be decomposed into a plurality of layers. When decomposed into a plurality of layers, the layers from bottom to top may be sequentially referred to as a first layer sub-network, a second layer sub-network, a third layer sub-network, ..., and an M layer sub-network, where the top layer network may also be referred to as an upper layer sub-network, and the first layer sub-network may also be referred to as a bottom layer sub-network.

Figure 3:
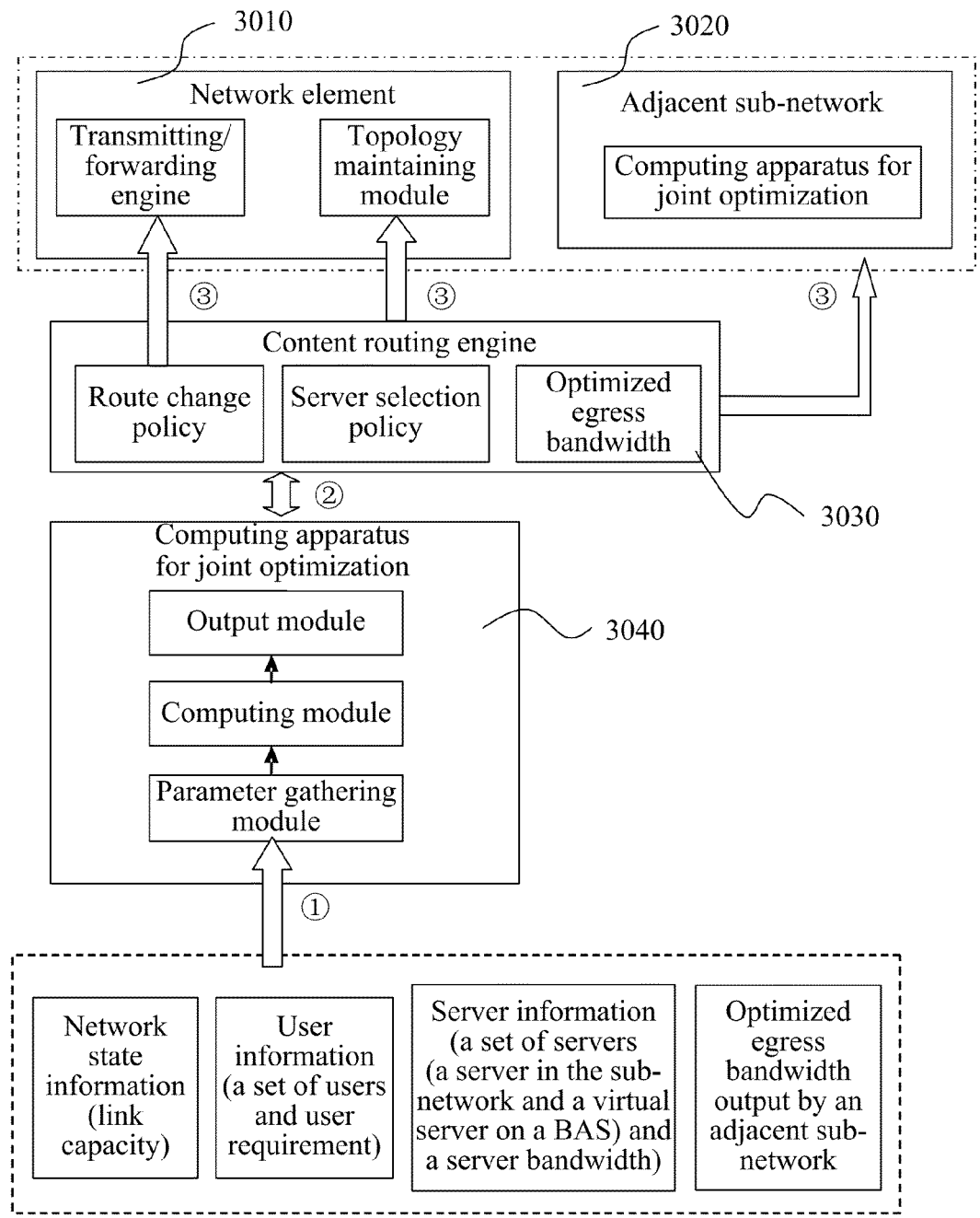
FIG. 3 shows an embodiment of a computing apparatus for joint optimization.

FIG. 3 shows an embodiment of a computing apparatus for joint optimization. The computing apparatus for joint optimization includes a parameter gathering module, a computing module and an output module.

The parameter gathering module is responsible for gathering network state information, server information, user requirement information and optimized output bandwidth output by an adjacent sub-network, and providing the gathered input for the computing module. The network state information includes link bandwidth, quality of service QoS of a link, and cost of the link. The user requirement information includes a set of users and a requirement of a user for content. The server information includes a set of servers and server bandwidth. The set of the servers includes a server in a sub-network and a virtual server at an ingress of an adjacent sub-network. The optimized egress bandwidth output by the adjacent sub-network is egress bandwidth that can be provided by the adjacent sub-network after joint optimization computation is performed in the adjacent sub-network, and the bandwidth is served as bandwidth of the virtual server at the ingress of the adjacent sub-network.

The computing module receives the network state information, the server information, the user information and the optimized output bandwidth output by the adjacent sub-network, which are gathered by the parameter gathering module, and the computing module performs joint optimization algorithm computation to compute the egress bandwidth that can be provided by the sub-network, required ingress bandwidth, and a corresponding routing policy and server selection policy, and provides results for the output module.

The output module receives the optimal results computed by the computing module, compares the ingress bandwidth required by this sub-network and the egress bandwidth that can be provided by the adjacent sub-network, and if a difference between the two is within an error range, the output module provides the routing policy and the server selection policy for a content routing engine. Meanwhile, the output module provides the egress bandwidth that can be provided by the sub-network for the content routing engine.

To further understand the implementation principle of the above apparatus for joint optimization, the principle of the virtual server at the ingress of the adjacent sub-network and the principle of establishing a joint optimization mathematical model are further illustrated in the following.

A user in the sub-network may download content from a server in this sub-network, and may also download content from a server in another sub-network or a server in an upper layer sub-network. When the user in the sub-network requests the server off the sub-network, the request needs to pass an egress where this sub-network and another sub-network are connected. Therefore, taking one sub-network as a unit, a server off the sub-network may be considered as a virtual server located on a device at the ingress of this sub-network, and the smallest one of a sum of bandwidth that can be provided by all servers in the adjacent sub-network, the maximum egress bandwidth of the adjacent sub-network and the maximum ingress bandwidth of this sub-network is taken as the bandwidth that can be provided by the virtual server at the ingress of this sub-network. The smaller one of the sum of bandwidth that can be provided by all the servers in the adjacent sub-network and the maximum egress bandwidth of the adjacent sub-network is also referred to as optimized egress bandwidth of the adjacent sub-network. If it is not otherwise stated herein, the maximum egress bandwidth of the sub-network is the value obtained by subtracting egress background traffic from the egress bandwidth of this sub-network, and the maximum ingress bandwidth of the sub-network is the value obtained by subtracting egress background traffic from the ingress bandwidth of this sub-network.

For this sub-network, it is assumed that a user set T is a set of all users requesting CP content in this sub-network, and a server set S is a set of all servers in the sub-network and the virtual server on the device at the ingress. Server bandwidth in the sub-network is the bandwidth that can be provided by a server, and the bandwidth of the virtual server on the device at the ingress is a certain value that is not greater than the value obtained by subtracting the ingress background traffic from the ingress bandwidth of the sub-network. In initial computation, the value may be predicted through statistics according to network information. After the adjacent sub-network outputs the optimized egress bandwidth, the bandwidth of the virtual server on the device at the ingress is the smaller one of the value obtained by subtracting ingress background traffic from the optimized egress bandwidth output by the adjacent sub-network and the value obtained by subtracting ingress background traffic from the ingress bandwidth of this sub-network. A starting node set I of the background traffic is a set composed of the nodes requesting the background traffic in the sub-network, a termination node set J is a set of egress nodes in a metropolitan area network, and from a perspective of the sub-network, it is assumed that there is a virtual background traffic termination node on the device at the ingress.

In this sub-network, a joint optimization algorithm mathematical model is established by using a convex optimization technique and NBS (Nash Bargaining Solution, Nash bargaining solution) of a game theory, that is, a constrained joint optimization problem is established when constrained conditions, such as the link information, the server and bandwidth information, and the user requirement information are considered. The optimization problem is solved to obtain a set of optimal values, and the set of optimal values reflect the optimal route change policy of the TE and the optimal server selection policy of the SS. According to this set of optimal values, bandwidth requirements of a user on a server may be computed, and the requirements also include a bandwidth requirement on the server off the sub-network, that is, the bandwidth requirement of the virtual server on the device at the ingress. The smaller value of the valued obtained by subtracting the background traffic from the required bandwidth and the valued obtained by subtracting the background traffic from the maximum ingress bandwidth at this port of the sub-network is taken as the optimized ingress bandwidth at this port of the sub-network. According to this set of optimal values, the remaining bandwidth that can be provided to the outside by the server in the sub-network through the port may further be computed. The smaller value of the valued obtained by subtracting the background traffic from the bandwidth and the valued obtained by subtracting the background traffic from the maximum egress bandwidth at this port of the sub-network is taken as the optimized egress bandwidth at this port of the sub-network.

Figure 4:
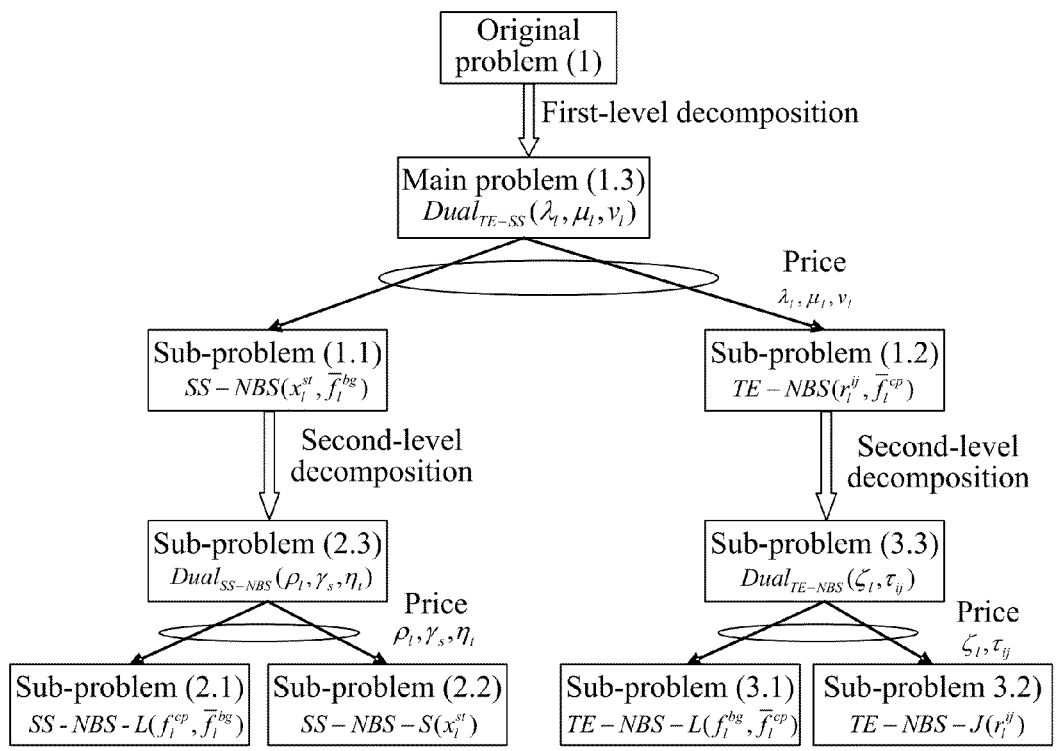
FIG. 4 shows an embodiment of two-level decomposition of a joint optimization mathematical model.

FIG. 4 shows an embodiment of solving joint optimization. Two sub-problems SS-NBS and TE-NBS after first-level decomposition of an original problem of the joint optimization are further decomposed at a second level from a perspective of a link, a server and a background traffic termination point, so as to make the problems be decomposed into smaller solvable sub-problems, thereby reducing algorithm execution time.

A decomposition principle is as follows.

Firstly, the joint optimization mathematical model of a network is decomposed at the first level according to a paired decomposition method, to decompose it into two sub-problems SS-NBS and TE-NBS as well as a main problem Dual$_{TE\text{-}SS}$, and the main problem Dual$_{TE\text{-}SS}$ controls the two sub-problems SS-NBS and TE-NBS through price variables $\lambda_l$, $\mu_l$ and $v_l$ which are introduced by the decomposition method. Since the two sub-problems SS-NBS and TE-NBS are still constrained optimization problems, it is necessary to perform further decomposition. At this time, taking a link 1 and a server s as units, the sub-problem SS-NBS is decomposed at the second level into two sub-problems SS-NBS-L and SS-NBS-S as well as a main problem DualSS-NBS, and the main problem DualSS-NBS controls the two sub-problems SS-NBS-L and SS-NBS-S through price variables $\rho_l$, $\gamma_s$, and $\eta_l$ which are introduced by the second-level decomposition.

Since the two sub-problems SS-NBS-L and SS-NBS-S are already smallest solvable sub-problems, it is not necessary to further decompose the two sub-problems. Otherwise, a similar decomposition method still needs to be adopted for further decomposition until a smallest solvable sub-problem is obtained. Similarly, taking a link 1 and a background traffic termination point j as units, the sub-problem TE-NBS is decomposed at a second level into two sub-problems TE-NBS-L and TE-NBS-J as well as a main problem DualTE-NBS, and the main problem DualTE-NBS controls the two sub-problems TE-NBS-L and TE-NBS-J through price variables $\xi_i$ and $\tau_{ij}$ which are introduced by the second-level decomposition. Since the two sub-problems TE-NBS-L and TE-NBS-J are already smallest solvable sub-problems, it is not necessary to further decompose the two sub-problems. Otherwise, a similar decomposition method still needs to be adopted for further decomposition until a smallest solvable sub-problem is obtained.

The above process of the two-level decomposition is further described in detail in the following.

1: The original problem of the joint optimization

By using the convex optimization technique and the NBS in the game theory, the mathematical model of the joint optimization problem in the sub-network is established as follows:

$$\text{maximize } \log\left(TE_0 - \sum_l g_l(f_l^{bg} + \overline{f}_l^{cp})\right) + \log\left(SS_0 - \sum_l h_l(f_l^{cp} + \overline{f}_l^{bg})\right) \quad (1)$$

$$\text{Subject to } f_l^{cp} = \sum_{(s,t)} x_l^{st}, \; f_l^{bg} = \sum_{(i,j)\notin S\times T} x_{ij} \cdot r_l^{ij}, \; \forall l$$

$$\overline{f}_l^{cp} = f_l^{cp}, \; \overline{f}_l^{bg} = f_l^{bg}, \; f_l^{cp} + f_l^{bg} \leq C_l, \; \forall l$$

$$\sum_{l:l\in In(v)} r_l^{ij} - \sum_{l:l\in Out(v)} r_l^{ij} = I_{v=j}, \; \forall (i,j)\notin S\times T, \; \forall v \in V\setminus\{i\}$$

$$\sum_{s\in S}\left(\sum_{l:l\in In(v)} x_l^{st} - \sum_{l:l\in Out(v)} x_l^{st}\right) = M_t \cdot I_{v=t}, \; \forall v \notin S, \; \forall t \in T$$

$$0 \leq \sum_{t\in T}\left(\sum_{l:l\in Out(v)} x_l^{st} - \sum_{l:l\in In(v)} x_l^{st}\right) \leq B_s \cdot I_{v=s}, \; \forall v \notin T, \; \forall s \in S$$

Variables $x_l^{st} \geq 0; \; 0 \leq r_l^{ij} \leq 1, \; \forall (i,j) \notin S\times T; \; \overline{f}_l^{cp}; \; \overline{f}_l^{bg}$.

In the formula, $(TE_0, SS_0)$ represents a current state, that is, optimal values obtained when the TE and the SS are independently optimized; $g_l(\cdot)$ and $h_l(\cdot)$ are cost functions taken by the TE and the SS of the joint optimization, respectively, and both are functions of the link 1; $f_l^{bg}$ and $\overline{f}_l^{cp}$ represent the background traffic of the link 1 and first choice CP traffic of the link 1 from the perspective of an ISP, respectively; and $f_l^{cp}$ represent the CP traffic of link 1 and first choice background traffic of the link 1 from the perspective of the CP, respectively; $x_l^{st}$ represents the CP traffic generated by the pair (s, t) on the link 1; $x_{ij}$ and $r_l^{ij}$ represent the background traffic of the pair (i, j) and the proportion of the background traffic generated by the pair (i, j) on the link 1, respectively; $C_l$, $M_t$ and $B_s$ represent the capacity of the link 1, the requirement of the user t and the bandwidth of the server s, respectively; $I_{v=j}$ is an indicator function, which represents that the function takes 1 when a node v is the node j, and the function takes 0 when the node v is a node other than the node i and the node j; the meaning of $I_{v=t}$ and $I_{v=s}$ is the same as that of $I_{v=j}$; and $l \in In(v)$ and $l \in Out(v)$ represent a link through which traffic flows into the node v and a link through which traffic flows out of the node v, respectively. The variables $x_l^{st}$, $r_l^{ij}$, $\overline{f}_l^{cp}$ and $\overline{f}_l^{bg}$ are the optimal variables to be solved in the joint optimization problem.

Perform Lagrange transformation on a part of the above formula to obtain:

$$L_{TE-SS}(x_l^{st}, r_l^{ij}, \overline{f}_l^{cp}, \overline{f}_l^{bg}, \lambda_l, \mu_l, \nu_l) = \quad (2)$$

$$\log\left(TE_0 - \sum_l g_l(f_l^{bg} + \overline{f}_l^{cp})\right) + \sum_l \mu_l(f_l^{bg} - \overline{f}_l^{bg}) +$$

$$\log\left(SS_0 - \sum_l h_l(f_l^{cp} + \overline{f}_l^{bg})\right) + \sum_l \nu_l(f_l^{cp} - \overline{f}_l^{cp}) +$$

$$\sum_l \lambda_l(C_l - f_l^{cp} - f_l^{bg}) = \log\left(TE_0 - \sum_l g_l(f_l^{bg} + \overline{f}_l^{cp})\right) +$$

$$\sum_l (\mu_l f_l^{bg} - \nu_l \overline{f}_l^{cp} - \lambda_l f_l^{bg}) + \log\left(SS_0 - \sum_l h_l(f_l^{cp} + \overline{f}_l^{bg})\right) +$$

$$\sum_l (\nu_l f_l^{cp} - \mu_l \overline{f}_l^{bg} - \lambda_l f_l^{cp}) + \sum_l \lambda_l C_l.$$

By using a paired decomposition method, the above formula may be decomposed into two sub-problems SS-NBS and TE-NBS, where the two sub-problems are controlled by a main problem $\text{Dual}_{TE-SS}(\lambda_l, \mu_l, \nu_l)$.

(1.1): The sub-problem SS-NBS SS-NBS($x_l^{st}, \overline{f}_l^{bg}$)

$$\text{maximize } \log\left(SS_0 - \sum_l h_l(f_l^{cp} + \overline{f}_l^{bg})\right) + \sum_l (\nu_l f_l^{cp} - \mu_l \overline{f}_l^{bg} - \lambda_l f_l^{cp}) \quad (3)$$

$$\text{Subject to } f_l^{cp} = \sum_{(s,t)} x_l^{st}, \; \forall l$$

$$\sum_{s\in S}\left(\sum_{l:l\in In(v)} x_l^{st} - \sum_{l:l\in Out(v)} x_l^{st}\right) = M_t \cdot I_{v=t}, \; \forall v \notin S, \; \forall t \in T$$

$$0 \leq \sum_{t\in T}\left(\sum_{l:l\in Out(v)} x_l^{st} - \sum_{l:l\in In(v)} x_l^{st}\right) \leq B_s \cdot I_{v=s}, \; \forall v \notin T, \; \forall s \in S$$

Variables $x_l^{st} \geq 0, \; \forall (s,t) \in S\times T; \; \overline{f}_l^{bg}$.

(1.2): The sub-problem TE-NBS TE-NBS($r_l^{ij}, \overline{f}_l^{cp}$)

$$\text{maximize } \log\left(TE_0 - \sum_l g_l(f_l^{bg} + \overline{f}_l^{cp})\right) + \sum_l (\mu_l f_l^{bg} - \nu_l \overline{f}_l^{cp} - \lambda_l f_l^{bg}) \quad (4)$$

$$\text{Subject to } f_l^{bg} = \sum_{(i,j)\notin S\times T} x_{ij} \cdot r_l^{ij}, \; \forall l$$

$$\sum_{l:l\in In(v)} r_l^{ij} - \sum_{l:l\in Out(v)} r_l^{ij} = I_{v=j}, \; \forall (i,j) \notin S\times T, \; \forall v \in V\setminus\{i\}$$

Variable $0 \leq r_l^{ij} \leq 1, \; \forall (i,j) \notin S\times T; \; \overline{f}_l^{cp}$.

(1.3): The main problem $\text{Dual}_{TE-SS}(\lambda_l, \mu_l, \nu_l)$

Make $H(\lambda_l, \mu_l, \nu_l)$ as the maximum value of a target function of the sub-problem SS-NBS, and make $G(\lambda_l, \mu, \nu_l)$ as the maximum value of a target function of the sub-problem TE-NBS, where $$H(\lambda_l, \mu_l, \nu_l) =$$

$$\log\left(SS_0 - \sum_l h_l(f_l^{cp*} + f_l^{bg*})\right) + \sum_l (\nu_l f_l^{cp*} - \mu_l f_l^{bg*} - \lambda_l f_l^{cp*});$$

$$G(\lambda_l, \mu_l, \nu_l) = \log\left(TE_0 - \sum_l g_l(f_l^{bg*} + \overline{f}_l^{cp*})\right) +$$

-continued $$\sum_l \left( \mu_l f_l^{bg*} - v_l \overline{f}_l^{cp*} - \lambda_l f_l^{bg*} \right).$$

The main problem may be represented as:

$$\text{minimize } Dual_{TE\text{-}SS}(\lambda_l, \mu_l, v_l) = \tag{5}$$

$$H(\lambda_l, \mu_l, v_l) + G(\lambda_l, \mu_l, v_l) + \sum_l \lambda_l C_l$$

Variable $\lambda_l \geq 0; \mu_l; v_l$.

By analyzing the sub-problem SS-NBS and the sub-problem TE-NBS, it is found that the two sub-problems may further be decomposed from the perspective of the Link, the Server and the background traffic termination point, so as to make them to be decomposed into smaller sub-problems that can be solved in parallel.

2: Further decomposition of the sub-problem SS-NBS

The sub-problem SS-NBS SS-NBS($x_l^{st}$, $\overline{f}_l^{bg}$) in (1.1) may further be expressed as follows:

$$\text{maximize } \log\left( SS_0 - \sum_l h_l(f_l^{cp} + \overline{f}_l^{bg}) \right) + \sum_l \left( v_l f_l^{cp} - \mu_l \overline{f}_l^{bg} - \lambda_l f_l^{cp} \right) \tag{6}$$

$$\text{Subject to } f_l^{cp} = \sum_{(s,t)} x_l^{st} = \sum_{s \in S} \sum_{t \in T(s)} x_l^{st}, \forall l$$

$$\sum_{s \in S} \sum_{l: l \in In(t)} x_l^{st} = M_t, \forall t \in T$$

$$\sum_{t \in T} \sum_{l: l \in Out(s)} x_l^{st} \leq B_s, \forall s \in S$$

$$\sum_{l: l \in In(v)} x_l^{st} = \sum_{l: l \in Out(v)} x_l^{st}, \forall v \notin \{s, t\}$$

Variable $x_l^{st} \geq 0, \forall (s, t) \in S \times T; \overline{f}_l^{bg}$.

Here, T(s) represents the set of users served by the server s, and S(t) represents the set of servers serving a certain user t. A last constraint condition represents that for a middle node v which is neither a server nor a user, the traffic flowing into v is equivalent to the traffic flowing out of v. That is, for the middle node v, a traffic conversation law is satisfied. The formula is obviously true, and therefore, it is not concerned when a Lagrange expression is generated.

Perform the Lagrange transformation on the above formula to obtain:

$$L_{SS\text{-}NBS}(x_l^{st}, \overline{f}_l^{bg}, \rho_l, \gamma_s, \eta_t) = \log\left( SS_0 - \sum_l h_l(f_l^{cp} + \overline{f}_l^{bg}) \right) + \tag{7}$$

$$\sum_l \left( v_l f_l^{cp} - \mu_l \overline{f}_l^{bg} - \lambda_l f_l^{cp} \right) +$$

$$\sum_l \rho_l \left( f_l^{cp} - \sum_{s \in S} \sum_{t \in T(s)} x_l^{st} \right) +$$

$$\sum_s \gamma_s \left( B_s - \sum_{t \in T(s)} \sum_{l: l \in Out(s)} x_l^{st} \right) +$$

$$\sum_t \eta_t \left( \sum_{s \in S(t)} \sum_{l: l \in In(t)} x_l^{st} - M_t \right)$$

$$= \log\left( SS_0 - \sum_l h_l(f_l^{cp} + \overline{f}_l^{bg}) \right) +$$

$$\sum_l \left( v_l f_l^{cp} - \mu_l \overline{f}_l^{bg} - \lambda_l f_l^{cp} + \rho_l f_l^{cp} \right) +$$

$$\sum_s \sum_{t \in T(s)} \left( -\gamma_s \sum_{l: l \in Out(s)} x_l^{st} - \sum_{l \in L(s,t)} \rho_l x_l^{st} + \eta_t \sum_{l: l \in Out(s)} x_l^{st} \right) +$$

$$\sum_s \gamma_s B_s - \sum_t \eta_t M_t.$$

Here, $l \in L(s, t)$ represents the link from the server s to the user t.

The sub-problem SS-NBS is classified, according to the link l and the server s, into two types of sub-problems SS-NBS-L and SS-NBS-S. The two sub-problems are controlled by the main problem $Dual_{SS\text{-}NBS}(\rho_l, \gamma_s, \eta_t)$.

(2.1): The sub-problem SS-NBS-L: SS-NBS-L($f_l^{cp}$, $\overline{f}_l^{bg}$)

The link l:

$$\text{maximize } \log\left( SS_0 - \sum_l h_l(f_l^{cp} + \overline{f}_l^{bg}) \right) + \tag{8}$$

$$\sum_l \left( v_l f_l^{cp} - \mu_l \overline{f}_l^{bg} - \lambda_l f_l^{cp} + \rho_l f_l^{cp} \right)$$

Variable $f_l^{cp}$; $\overline{f}_l^{bg}$.

(2.2): The sub-problem SS-NBS-S: SS-NBS-S($x_l^{st}$)

The server s:

$$\text{maximize } \sum_{t \in T(s)} \left( -\gamma_s \sum_{l: l \in Out(s)} x_l^{st} - \sum_{l \in L(s,t)} \rho_l x_l^{st} + \eta_t \sum_{l: l \in Out(s)} x_l^{st} \right) \tag{9}$$

Variable $x_l^{st} \geq 0$.

(2.3): The main problem of SS-NBS: $Dual_{SS\text{-}NBS}(\rho_l, \gamma_s, \eta_t)$ Make $L_{SS\text{-}NBS\text{-}L}(\rho_l)$ as the maximum value of a target function of the sub-problem SS-NBS-L, and make $S_{SS\text{-}NBS\text{-}S}(\rho_l, \beta_s, \eta_t)$ as the maximum value of a target function of the sub-problem SS-NBS-S, where $$L_{SS\text{-}NBS\text{-}L}(\rho_l) = \log\left( SS_0 - \sum_l h_l(f_l^{cp*} + \overline{f}_l^{bg*}) \right) +$$

$$\sum_l \left( v_l f_l^{cp*} - \mu_l \overline{f}_l^{bg*} - \lambda_l f_l^{cp*} + \rho_l f_l^{cp*} \right);$$

$$S_{SS\text{-}NBS\text{-}S}(\rho_l, \gamma_s, \eta_t) = \sum_{t \in T(s)} \left( -\gamma_s \sum_{l: l \in Out(s)} x_l^{st*} - \sum_{l \in L(s,t)} \rho_l x_l^{st*} + \eta_t \sum_{l: l \in Out(s)} x_l^{st*} \right).$$

The main problem may be represented as:

$$\text{minimize } Dual_{SS-NBS}(\rho_l, \gamma_s, \eta_t) = \quad (10)$$

$$L_{SS-NBS-L}(\rho_l) + \sum_s S_{SS-NBS-S}(\rho_l, \gamma_s, \eta_t) + \sum_s \gamma_s B_s - \sum_t \eta_t M_t$$

Variable $\rho_l; \gamma_s; \eta_t$.

3: Further decomposition of the sub-problem TE-NBS

The sub-problem TE-NBS TE-NBS($r_l^{ij}$, $\bar{f}_l^{cp}$) in (1.2) may further be expressed as follows:

$$\text{maximize } \log\left(TE_0 - \sum_l g_l(f_l^{bg} + \bar{f}_l^{cp})\right) + \quad (11)$$

$$\sum_l \left(\mu_l f_l^{bg} - v_l \bar{f}_l^{cp} - \lambda_l f_l^{bg}\right)$$

Subject to $f_l^{bg} = \sum_{(i,j) \notin S \times T} x_{ij} \cdot r_l^{ij} = \sum_i \sum_{\substack{j \in J(i) \\ i \notin S \\ j \notin T}} x_{ij} \cdot r_l^{ij} = \sum_{\substack{j \notin T \\ i \notin S}} \sum_{i \in I(j)} x_{ij} \cdot r_l^{ij}$, $\forall l$ $\sum_{l: l \in In(j)} r_l^{ij} = 1, \forall (i,j) \notin S \times T$ $\sum_{l: l \in In(v)} r_l^{ij} = \sum_{l: l \in Out(v)} r_l^{ij}, \forall (i,j) \notin S \times T, \forall v \in V \setminus \{i,j\}$ Variable $0 \le r_l^{ij} \le 1, \forall (i,j) \notin S \times T; \bar{f}_l^{cp}$.

A last constraint condition represents that, for a middle node v which is neither a node i nor a node j, the background traffic flowing into v is equivalent to the background traffic flowing out of v, that is, a traffic conversation law is satisfied. The formula is obviously true, and therefore, it is not concerned when the Lagrange expression is generated.

Perform the Lagrange transformation on the above formula to obtain:

$$L_{TE-NBS}(r_l^{ij}, \bar{f}_l^{cp}, \zeta_l, \tau_{ij}) = \log\left(TE_0 - \sum_l g_l(f_l^{bg} + \bar{f}_l^{cp})\right) + \quad (12)$$

$$\sum_l \left(\mu_l f_l^{bg} - v_l \bar{f}_l^{cp} - \lambda_l f_l^{bg}\right) +$$

$$\sum_l \zeta_l\left(f_l^{bg} - \sum_{\substack{j \notin T \\ i \notin S}} \sum_{i \in I(j)} x_{ij} \cdot r_l^{ij}\right) +$$

$$\sum_{\substack{j \notin T}} \sum_{\substack{i \in I(j) \\ i \notin S}} \tau_{ij}\left(\sum_{l: l \in In(j)} r_l^{ij} - 1\right)$$

$$= \log\left(TE_0 - \sum_l g_l(f_l^{bg} + \bar{f}_l^{cp})\right) +$$

$$\sum_l \left(\mu_l f_l^{bg} - v_l \bar{f}_l^{cp} - \lambda_l f_l^{bg} + \zeta_l f_l^{bg}\right) +$$

$$\sum_{\substack{j \notin T}} \sum_{\substack{i \in I(j) \\ i \notin S}}$$

$$\left(\tau_{ij} \sum_{l: l \in In(j)} r_l^{ij} - x_{ij} \sum_{l \in L(i,j)} \zeta_l r_l^{ij}\right) -$$

$$\sum_{\substack{j \notin T}} \sum_{\substack{i \in I(j) \\ i \notin S}} \tau_{ij}.$$

Here, $l \in L(i,j)$ represents the link from i to j.

The sub-problem TE-NBS is classified, according to the link 1 and the background traffic termination point j, into two types of sub-problems TE-NBS-L and TE-NBS-J. The two sub-problems are controlled by the main problem $Dual_{TE-NBS}$ ($\xi_l, \tau_{ij}$).

(3.1): The sub-problem TE-NBS-L: TE-NBS-L($f_l^{bg}$, $\bar{f}_l^{cp}$)
The link 1:

$$\text{maximize } \log\left(TE_0 - \sum_l g_l(f_l^{bg} - \bar{f}_l^{cp})\right) + \quad (13)$$

$$\sum_l \left(\mu_l f_l^{bg} - v_l \bar{f}_l^{cp} - \lambda_l f_l^{bg} + \zeta_l f_l^{bg}\right)$$

Variable $f_l^{bg}; \bar{f}_l^{cp}$.

(3.2): The sub-problem TE-NBS-J: TE-NBS-J($r_l^{ij}$)
The background traffic termination point j:

$$\text{maximize } \sum_{\substack{i \in I(j) \\ i \notin S}} \left(\tau_{ij} \sum_{l: l \in In(j)} r_l^{ij} - x_{ij} \sum_{l \in L(i,j)} \zeta_l r_l^{ij}\right) \quad (14)$$

Variable $0 \le r_l^{ij} \le 1$.

(3.3): The main problem of TE-NBS: $Dual_{TE-NBS}(\mu_l, \tau_{ij})$
Make $L_{TE-NBS-L}(\xi_l)$ as the maximum value of a target function of the sub-problem TE-NBS-L, and make $L_{TE-NBS-J}(\xi_l, \tau_{ij})$ as the maximum value of a target function of the sub-problem TE-NBS-J, where $$L_{TE-NBS-L}(\zeta_l) = \log\left(TE_0 - \sum_l g_l(f_l^{bg*} + \bar{f}_l^{cp*})\right) +$$

$$\sum_l \left(\mu_l f_l^{bg*} - v_l \bar{f}_l^{cp*} - \lambda_l f_l^{bg*} + \zeta_l f_l^{bg*}\right);$$

$$L_{TE-NBS-L}(\zeta_l, \tau_{ij}) = \sum_{\substack{i \in I(j) \\ i \notin S}} \left(\tau_{ij} \sum_{l: l \in In(j)} r_l^{ij*} - x_{ij} \sum_{l \in L(i,j)} \zeta_l r_l^{ij*}\right).$$

The main problem may be represented as:

$$\text{minimize } Dual_{TE-NBS}(\zeta_l, \tau_{ij}) = \quad (15)$$

$$L_{TE-NBS-L}(\zeta_l) + \sum_{\substack{j \notin T}} L_{TE-NBS-J}(\zeta_l, \tau_{ij}) - \sum_{\substack{j \notin T}} \sum_{\substack{i \in I(j) \\ i \notin S}} \tau_{ij}$$

Variable $\zeta_l; \tau_{ij}$.

A computing module decomposes, according to the above decomposition process, the original problem into two sub-problems of smaller computation quantity, computes an optimal result, and feeds back it to an output module. The output module outputs the computation result to a content routing engine, and application of the result in the network may change a routing policy and a server selection policy. A route change policy allocates traffic to every path in an optimal manner, thereby solving the problem of traffic engineering. The server selection policy functions on the server (including a virtual server in the sub-network), and specifies the bandwidth that may be allocated to the server and a new set of users served by the server.

Figure 5:
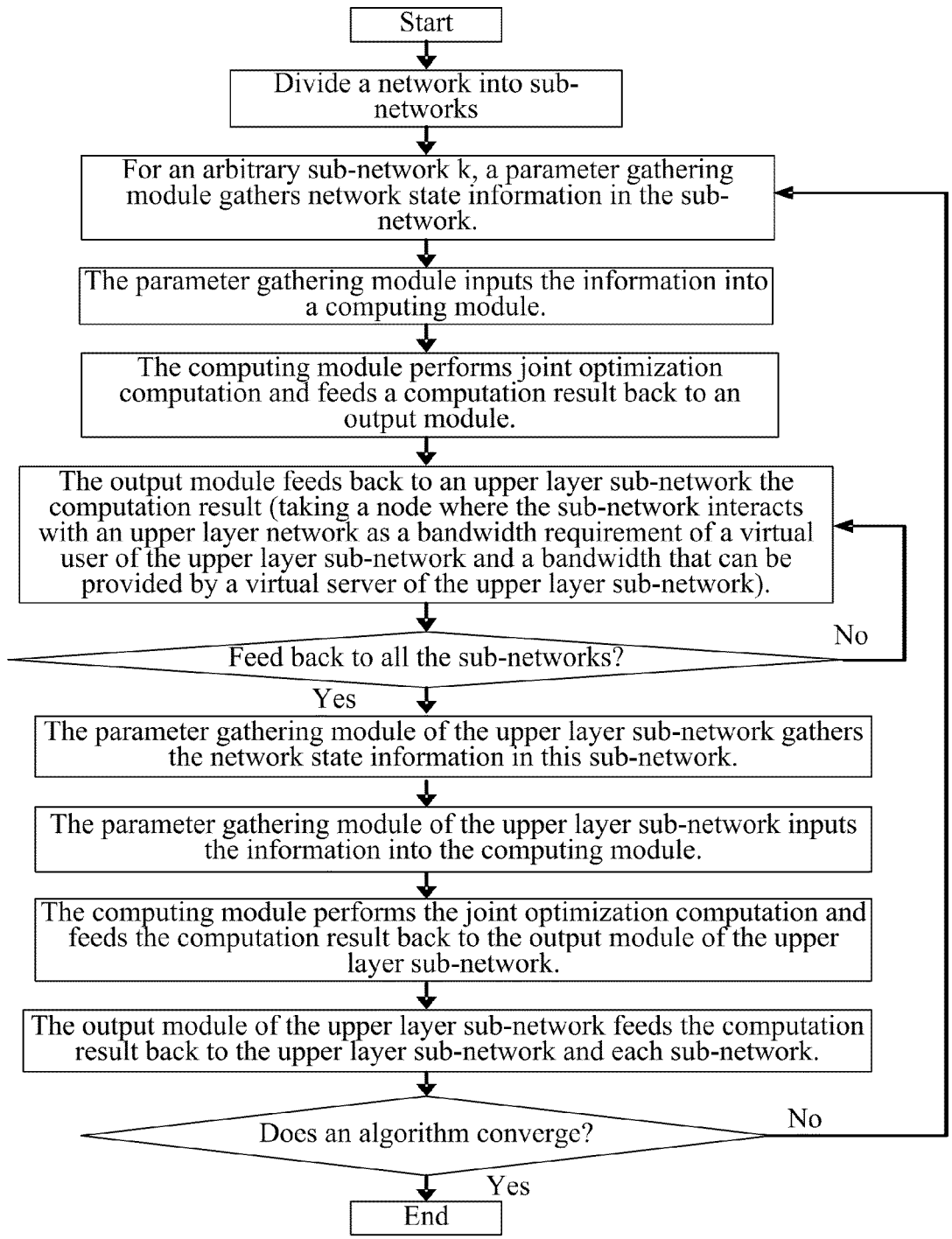
FIG. 5 shows an embodiment of a process for performing joint optimization in an entire network.

FIG. 5 shows a process for performing joint optimization in an entire network. The network to be jointly optimized is decomposed into a plurality of sub-networks, and the joint optimization is solved in every sub-network. If each sub-network does not obtain an optimized egress bandwidth value from an adjacent network in first solving, bandwidth of a virtual server on a device at an ingress is set as an initial value, and the initial value is a certain value that is not greater than the value obtained by subtracting ingress background traffic from the ingress bandwidth of the sub-network. The value may be predicted through statistics according to network information statistics, and may also be a value arbitrarily selected within this range that is not greater than the value obtained by subtracting ingress background traffic from the ingress bandwidth of the sub-network, such as half of the value obtained by subtracting the ingress background traffic from the ingress bandwidth of the sub-network. If the optimized egress bandwidth is obtained from the adjacent network, the smaller value of the value obtained by subtracting the ingress background traffic from the optimized egress bandwidth of the adjacent network and the value obtained by subtracting the ingress background traffic from the ingress bandwidth of the sub-network is selected as the bandwidth of the virtual server on the device at the ingress.

The above joint optimization is iteratively performed in each sub-network, and finally optimization problems of all sub-networks and upper layer sub-networks are converged to an optimal value, to reach Pareto optimization. A route change policy and a server selection policy after system convergence are sent to associated network elements in the network.

The entire process is implemented as follows.

Step 1: Assumed initial ingress bandwidth is set for every sub-network in a lower layer network, a parameter gathering module gathers network state information (for example, link information), server and bandwidth information, and user requirement information of the sub-network, and a computing module solves an optimal routing parameter and a server parameter of the sub-network according to the decomposition method of FIG. 4. Optimized egress bandwidth that can be provided by the sub-network is obtained, where, the optimized egress bandwidth refers to the smaller one of the maximum egress bandwidth of a port and the maximum bandwidth that can be provided by a server in the sub-network. Optimized ingress bandwidth of the sub-network is obtained, where the ingress bandwidth is the bandwidth that needs to be provided by a server off the sub-network.

Step 2: If a middle layer sub-network which is not a top layer exists, the parameter gathering module of a system for joint optimization in the middle layer sub-network gathers the optimized egress bandwidth computed by an adjacent lower layer sub-network, and the network state information (for example, the link information), the server and bandwidth information, and the user requirement information of the middle layer sub-network, and sets the assumed initial ingress bandwidth of an interface between the middle layer sub-network and an even higher upper layer sub-network. A computing module solves the optimal routing parameter and the server parameter of the middle layer sub-network according to the decomposition method of FIG. 4. The optimized egress bandwidth provided by the sub-network for the sub-network of the upper layer network and the sub-network of the lower layer network is obtained, where the optimized egress bandwidth refers to the smaller one of the maximum egress bandwidth of a port and the maximum bandwidth that can be provided by a server in the sub-network. The optimized ingress bandwidth of the sub-network is obtained, where the bandwidth is the bandwidth that needs to be provided by a server off the sub-network.

Step 3: For the top layer sub-network, the parameter gathering module of the system for joint optimization in the sub-network gathers the optimized egress bandwidth computed by an adjacent lower layer sub-network, and the network state information (for example, the link information) and the server and bandwidth information of the sub-network. A computing module solves the optimal routing parameter and the server parameter of the sub-network according to the decomposition method of FIG. 4. The optimized egress bandwidth provided by the sub-network for the sub-network in the lower layer network is obtained, where the optimized egress bandwidth refers to the smaller one of the maximum egress bandwidth of a port and the maximum bandwidth that can be provided by a server in the sub-network. The optimized ingress bandwidth of the sub-network is obtained, where the bandwidth is the bandwidth that needs to be provided by a server off the sub-network.

Step 4: The assumed initial ingress bandwidth set in step 2 is replaced with the optimized egress bandwidth of an interface to the lower layer sub-network computed in step 3, step 2 is performed, the assumed initial ingress bandwidth set in step 1 is replaced with the optimized egress bandwidth of an interface to the lower sub-network computed in step 2, step 1 is performed, and if the computed assumed ingress bandwidth and the optimized ingress bandwidth are within an error range, the optimal routing parameter and the server parameter are output for application in the corresponding sub-network. Otherwise, step 1, step 2, step 3 and step 4 are performed repeatedly.

Figure 6:
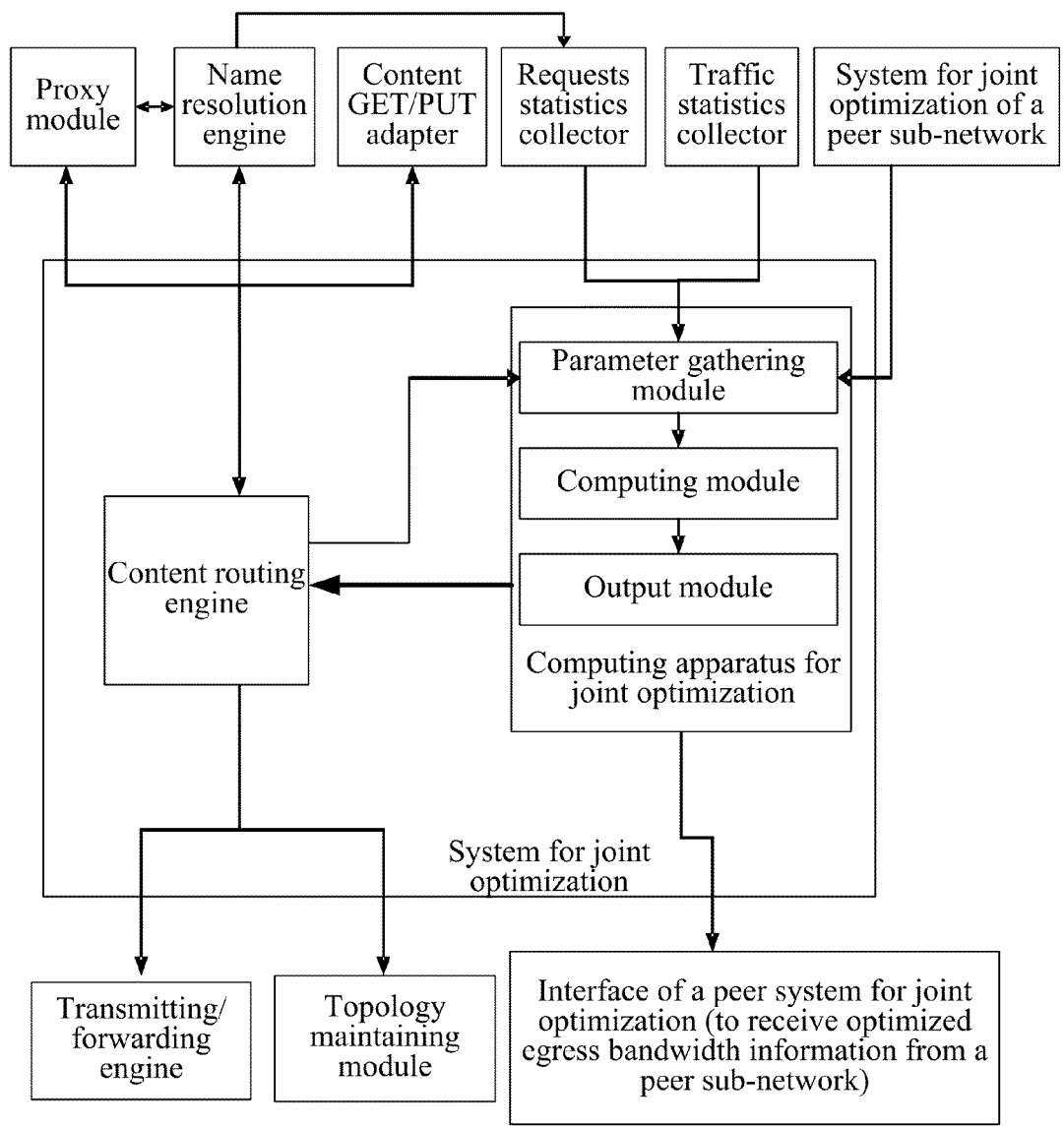
FIG. 6 shows an embodiment of a control system for joint optimization.

FIG. 6 shows an embodiment of a system for joint optimization. The system for joint optimization includes a content routing engine and a computing apparatus for joint optimization. For composition of the computing apparatus for joint optimization, reference is made to FIG. 3. In FIG. 6, connection relations among the system for joint optimization and a proxy module, a name resolution engine, a content GET/PUT adapter, a traffic statistics collector, a requests statistics collector, a system for joint optimization of a peer sub-network, a transmitting/forwarding engine and a topology maintaining module are further included.

The proxy module (Proxy): As a proxy of a user, it establishes a bridge between a user terminal and the system for joint optimization, and may also be used to gather requests from the user. The proxy module may be deployed on the edge of a network, for example, deployed on a DSLAM.

The content routing engine (Content Routing Engine): It determines how to obtain required content. When the content routing engine finds that the required content is not in a local buffer device, it uses the name resolution engine (Name Resolution Engine) to obtain a node list having the content, and takes the node list as server information and inputs it to a parameter gathering module. The content routing engine obtains, from an output module of the computing apparatus for joint optimization, a route change policy and a server selection policy, and converts them into a route change policy and a server selection policy that can be deployed and implemented, where the route change policy is input into the transmitting/forwarding engine to perform a routing policy of a bottom layer, and the server selection policy is input into the topology maintaining module to perform server selection of a content layer.

The name resolution engine (Name Resolution Engine): It mainly returns an appropriate node list having the content required by the user.

The content GET/PUT adapter: It acquires the content required by the content routing engine from the local buffer device and returns the content to the content routing engine, so that the content routing engine routes the content to a target user.

The traffic statistics collector (Traffic Statistics Collector): It collects background traffic information, link information and the like, and reports the collected information to the parameter gathering module.

The requests statistics collector (Requests Statistics Collector): It collects user requirements and sends the collected user requirements to the parameter gathering module.

The system for joint optimization of a peer sub-network: It obtains the optimized egress bandwidth computed by the computing apparatus for joint optimization of this sub-network, the peer sub-network obtains, through the optimized egress bandwidth, the assumed ingress bandwidth required for performing joint optimization, and the bandwidth is taken as bandwidth of a virtual server on a device at the ingress.

The parameter gathering module: It mainly gathers user requests, server list information, dynamic characteristics of traffic, and optimized egress bandwidth information of a peer sub-network.

The computing module: It uses an optimization decomposition theory to compute an optimal (user, server) pair, and obtains an end-to-end path formed by every (user, server) pair and a traffic distribution rate on every path.

The output module: The output module is responsible for receiving an optimal computation result from the computing module, and inputting the result to the content routing engine.

The transmitting/forwarding engine: It receives an instruction from an IP layer of the content routing engine, performs traffic transmission, and implements optimal routing of a bottom layer.

The topology maintaining module: It receives an instruction from an application layer of the content routing engine, performs server selection, and implements content layer routing.

An interactive process of the system for joint optimization is as follows.

1: The proxy module completes the gathering of requests from a client user for content.

2: The name resolution engine performs content resolution according to the name of the requested content, to acquire requirement information of the user for the content and input the information to a request generator.

3: The content routing engine obtains the server information. Firstly, the content routing engine obtains the server information on the local buffer device through the content GET/PUT adapter, and when the local buffer device does not have the required content, the content routing engine further obtains, through the name resolution engine, information of the node list having the content required by the user.

4: The parameter gathering module obtains request information of the user from the request generator, obtains the server information from the content routing engine, obtains the network state information (for example, the background traffic information and the link information) from a traffic generator, and obtains egress bandwidth information and ingress bandwidth information of the peer sub-network from an interface of the peer sub-network.

5: The computing module uses the information obtained by the parameter gathering module and the optimization decomposition theory to perform joint optimization computation, obtains the optimal (user, server) pair, and obtains the end-to-end path formed by every (user, server) pair and the traffic distribution rate on every path.

6. The output module inputs the optimal computation result of the computing module to the content routing engine.

7: The content routing engine obtains an optimal solution from the output module, and converts into the route change policy and the server selection policy that can be deployed and implemented, where the former is input into the transmitting/forwarding engine to perform the routing policy of the bottom layer, and the latter is input to the topology maintaining module to perform the server selection of the content layer. Besides, related information required for updating the egress bandwidth and the ingress bandwidth is further input to the peer sub-network.

8: The transmitting/forwarding engine receives the route change policy from the content routing engine, so as to modify bottom layer routing and perform the route change policy of the IP layer.

9: The topology maintaining module receives the server selection policy from the content routing engine, so as to perform server selection of the application layer, so as to establish the mapping between the user and the server.

In this embodiment, the problem of global network optimization is equivalently converted into several problems of sub-network optimization. Compared with the problem of joint optimization in an entire network, variables and constraint conditions of a joint optimization model in the sub-network are relatively small, and small computation quantity is involved. In this embodiment, a method for solving the joint optimization model in the sub-network is also disclosed. According to a link, a server and a background traffic termination point, an original mathematical model is decomposed into smaller solvable sub-problems, thereby reducing algorithm execution time. Since the sub-networks are coupled through the bandwidth, the coupling relation is relatively loose, which is favorable for solving the optimization problem.

Persons of ordinary skill in the art should understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a ROM, a RAM, a magnetic disk or an optical disk.

Finally, it should be noted that the above embodiments are merely provided for describing the technical solutions of the present invention, but not intended to limit the present invention. It should be understood by persons of ordinary skill in the art that though the present invention has been described in detail with reference to the exemplary embodiments, modifications or equivalent replacements can be made to the technical solutions of the present invention, as long as such modifications or replacements do not depart from the idea and scope of the technical solutions of the present invention.

What is claimed is:

1. A method for joint optimization in a network, wherein the network comprises a plurality of sub-networks, the method comprising:

obtaining link information, server and bandwidth information, and user requirement information of a sub-network, wherein the server and bandwidth information comprises virtual server bandwidth of every external port of the sub-network, and the virtual server bandwidth is bandwidth of a server off the sub-network, wherein each external port provides a connection between the sub-network and another sub-network providing the virtual server bandwidth through the respective external port, and wherein the bandwidth of the server off the sub-network is required by the sub-network through the external port;

obtaining an optimal routing parameter and a server selection parameter within the sub-network according to the link information, the server and bandwidth information, and the user requirement information;

obtaining optimized ingress bandwidth of every external port of the sub-network according to the optimal routing parameter and the server selection parameter; and comparing the optimized ingress bandwidth and the virtual server bandwidth of every external port, and if results of the comparison between the optimized ingress bandwidth and the virtual server bandwidth of all external ports are smaller than a set error value, applying the optimal routing parameter and the server selection parameter for routing and server selection within the sub-network.

2. The method according to claim 1, wherein if all results of the comparison between the optimized ingress bandwidth and the virtual server bandwidth of all the external ports are not smaller than the set error value, the process of obtaining the optimized ingress bandwidth and comparing the optimized ingress bandwidth and the virtual server bandwidth is repeated, until the results of the comparison are smaller than the set error value; and wherein repeating the obtaining the optimized ingress bandwidth and the comparing the optimized ingress bandwidth comprise obtaining an additional optimized ingress bandwidth and comparing the additional optimized ingress bandwidth to the virtual server bandwidth of all the external ports.

3. The method according to claim 1, wherein the method for obtaining the virtual server bandwidth of the external port comprises:

if optimized egress bandwidth of an adjacent sub-network corresponding to an external port is obtained, the virtual server bandwidth of the external port being the smaller one of the optimized egress bandwidth and available ingress bandwidth of the external port;

if optimized egress bandwidth of an adjacent sub-network corresponding to the external port is not obtained, the virtual server bandwidth of the external port being a certain value that is smaller than available ingress bandwidth of the external port.

4. The method according to claim 1, further comprising:

obtaining optimized egress bandwidth of every external port of the sub-network according to the computed optimal routing parameter and server selection parameter of the sub-network.

5. The method according to claim 1, wherein the obtaining the optimal routing parameter and the server selection parameter of the sub-network according to the link information, the server and bandwidth information, and the user requirement information comprises:

establishing a joint optimization mathematical model of the sub-network;

performing first-level decomposition of the joint optimization mathematical model to obtain two sub-problems SS-NBS and TE-NBS;

performing second-level decomposition of the two sub-problems SS-NBS and TE-NBS according to a link, the server and a background traffic termination point, wherein the second-level decomposition of the sub-problem SS-NBS comprises taking a link 1 and a server s as units to perform the second-level decomposition to obtain two sub-problems SS-NBS-L and SS-NBS-S as well as a main problem Dualss-NBs, and the main problem Dualss-NBs controls the two sub-problems SS-NBS-L and SS-NBS-S through introduced price variables $P_1$, $Y_s$ and $17_1$; the decomposition of the sub-problem TE-NBS comprises taking a link 1 and a background traffic termination point j as units to perform the second-level decomposition to obtain two sub-problems TE-NBS-L and TE-NBS-J as well as a main problem DuahE-NBs, and the main problem DuahE-NBs controls the two sub-problems TE-NBS-L and TE-NBS-J through introduced price variables $t_{i_1}$ and rij; and computing the optimal routing parameter and the server selection parameter of the sub-network according to the decomposed joint optimization mathematical model.

6. The method according to claim 1, wherein the obtaining the optimized ingress bandwidth of every external port of the sub-network according to the optimal routing parameter and the server selection parameter comprises:

applying the optimal routing parameter and the server selection parameter of the sub-network to compute a user requirement for the virtual server bandwidth through the external port, and taking a smaller value of the required virtual server bandwidth and available ingress bandwidth of the external port as the optimized ingress bandwidth of the port in the sub-network.

7. The method according to claim 4, wherein the obtaining the optimized egress bandwidth of every external port of the sub-network according to the computed optimal routing parameter and server selection parameter of the sub-network comprises:

applying the optimal routing parameter and the server selection parameter of the sub-network to compute remaining bandwidth that can be provided to the outside by the server in the sub-network through the external port, and taking a smaller value of the remaining bandwidth and available egress bandwidth of the external port as the optimized egress bandwidth of the port in the sub-network.

8. The method according to claim 1, wherein the link information comprises:

at least one of the following: link bandwidth, quality of service QoS of a link, and cost of the link.

9. The method according to claim 1, wherein the server and bandwidth information further comprises:

at least one of the following: a set of servers in the sub-network and bandwidth that can be provided by every server.

10. The method according to claim 1, wherein the user requirement information comprises:

at least one of the following: a set of users and a requirement of a user for content.

11. A computing apparatus for joint optimization, comprising:
  a processor;
  a nontransitory computer readable medium connected to the processor and having stored thereon instructions for causing the processor to:
  obtain link information, server and bandwidth information, and user requirement information of a sub-network, wherein the server and bandwidth information comprises virtual server bandwidth of every external port of the sub-network, wherein each external port provides a connection between the sub-network and another sub-network providing the virtual server bandwidth through the respective external port, and wherein the virtual server bandwidth is bandwidth of a server off the sub-network, wherein the bandwidth of the server off the sub-network is required by the sub-network through the external port;
  obtain an optimal routing parameter and a server selection parameter for routing and sever selection within the sub-network according to the link information, the server and bandwidth information, and the user requirement information, and obtain optimized ingress bandwidth of every external port of the sub-network according to the optimal routing parameter and the server selection parameter; and
  compare the optimized ingress bandwidth and the virtual server bandwidth of every external port, and if results of the comparison between the optimized ingress bandwidth and the virtual server bandwidth of all external ports are smaller than a set error value, apply the optimal routing parameter and the server selection parameter in the sub-network, and output the optimal routing parameter and the server selection parameter.

12. A communication network, the network comprising a plurality of sub-networks connected through one or more external ports in each of the plurality of sub-networks, and each sub-network of the plurality of sub-networks configured to participate in joint optimization of the communication network and comprising:
  a processor;
  a nontransitory computer readable medium connected to the processor and having stored thereon instructions for causing the processor to:
    obtain link information, server and bandwidth information, and user requirement information of the sub-network, wherein the server and bandwidth information comprises virtual server bandwidth of every external port of the sub-network, wherein each external port provides a connection between the sub-network and another sub-network providing the virtual server bandwidth through the respective external port;
    compute an optimal routing parameter and a server selection parameter for routing and server selection within the sub-network according to the link information, the server and bandwidth information, and the user requirement information;
    obtain optimized ingress bandwidth of every external port of the sub-network:
    compare the optimized ingress bandwidth of every external port and the virtual server bandwidth of the external port: and
    apply the optimal routing parameter and the server selection parameter in the network if a comparison result is smaller than a set error value.

13. The communication network according to claim 12, wherein the plurality of sub-networks comprises a first layer sub-network and one or more upper layer sub-networks, wherein the first layer sub-network comprises at least one external port providing a connection to an adjacent upper layer sub-network, and wherein the upper layer sub-network comprises an external port providing a connection to a lower layer sub-network and an external port providing a connection to an even higher upper layer sub-network; and
  wherein, the nontransitory computer readable medium connected for each sub-network further has stored thereon instructions for causing the processor of the respective sub-network to, when the comparison result for each external port in each sub-network is smaller than the set error value, apply the optimal routing parameter and the server selection parameter in the respective sub-network.

14. A system for joint optimization, comprising:
  a processor;
  a nontransitory computer readable medium connected to the processor and having stored thereon instructions for causing the processor to:
    gather link information, server and bandwidth information, and user requirement information;
    obtain a routing parameter and a server selection parameter for routing and server selection within the system;
    obtain optimized ingress bandwidth and optimized egress bandwidth of every external port of the system, wherein each external port of the system provides a connection between the system and a sub-network of a local network; and
    convert the routing parameter and the server selection parameter obtained by the computing apparatus for joint optimization into a routing parameter and a server selection parameter applied in the local network if the difference between the optimized ingress bandwidth of every external port and the smaller of the optimized egress bandwidth of the respective external port and available ingress bandwidth of the respective external port is smaller than a set error value.

* * * * *